July 13, 1965 N. E. SINDLINGER 3,194,344
SPRING MOTOR

Filed May 4, 1964 2 Sheets-Sheet 1

INVENTOR.
NORMAN E. SINDLINGER
BY

ATTORNEYS

July 13, 1965 N. E. SINDLINGER 3,194,344
SPRING MOTOR
Filed May 4, 1964 2 Sheets-Sheet 2
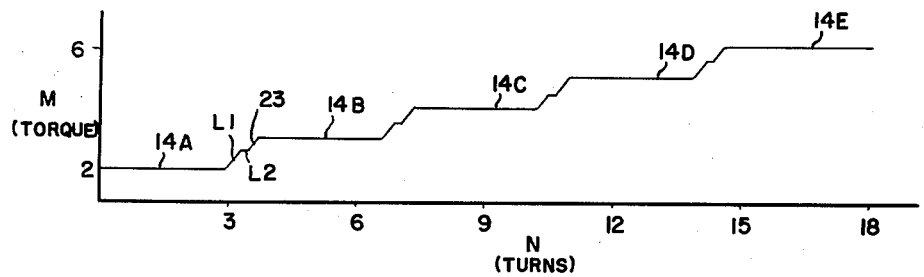
FIG. 5.
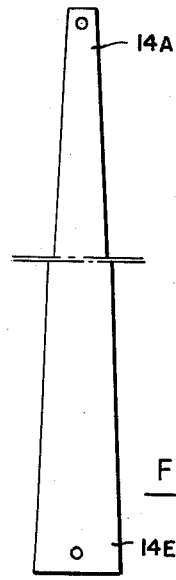
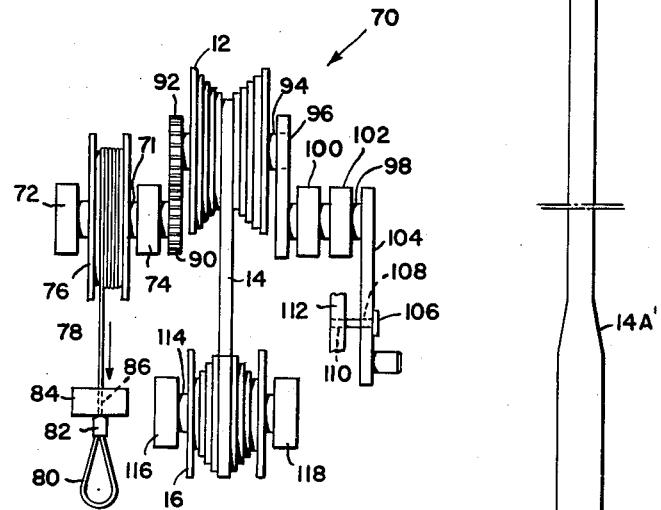
FIG. 6.
FIG. 8.
FIG. 7.
FIG. 4.
INVENTOR.
NORMAN E. SINDLINGER
BY
ATTORNEYS 3,194,344
SPRING MOTOR
Norman E. Sindlinger, Medford Lakes, N.J., assignor to Ametek, Inc., New York, N.Y., a corporation of Delaware
Filed May 4, 1964, Ser. No. 364,620
16 Claims. (Cl. 185—39)

This invention relates to a motor of the spring type and more particularly relates to such a motor which can exert a plurality of substantially different and substantially constant forces.

In many applications it is desirable to have a spring motor which can produce a number of different forces which are relatively constant. Further, in certain fields such as in the field of orthopedic tensioning it is highly desirable to be able to change these forces without movement of the output means associated with the motor.

It is therefore a primary object of this invention to provide a variable force spring motor which can produce a plurality of different substantially constant forces which can be varied without movement of the output means associated with the motor.

Relative to the prior art, tightly coiled noncumulative force ribbon springs are well known and are in wide commercial use. Such springs are disclosed in United States Patents No. 2,609,191 and No. 2,609,192, both issued on September 2, 1952. Further, it is known to employ such springs to make an "A" motor by coiling such a spring directly onto a pair of spaced drums as disclosed in FIGURE 11 of Patent No. 2,647,743, issued August 4, 1953. Such a spring may also be used to make a "B" motor by coiling it directly on one drum and reverse winding it onto a spaced second drum (see Patent No. 2,063,799, issued November 8, 1936). Such motors as used commercially generally have a zero or very small gradient and are not capable of producing abrupt and substantial changes in the output force when under load and without movement of the associated output means. It is therefore unexpected that such a result can be achieved with this invention.

The invention and its objects will be further clarified on reading the following description in conjunction with the drawings in which:

FIGURE 4 is a plan view partially broken away of an extended portion of the spring of the motor of FIGURE 1;

FIGURE 5 is a graph of the torque of a typical motor of the invention;

FIGURE 6 is a diagrammatic plan view of an alternative embodiment of the invention;

FIGURE 7 is a diagrammatic plan view of a second alternative embodiment of the invention; and FIGURE 8 is a plan view partially broken away of a spring for a motor of the invention shown in a fully extended condition.

Figure 1:
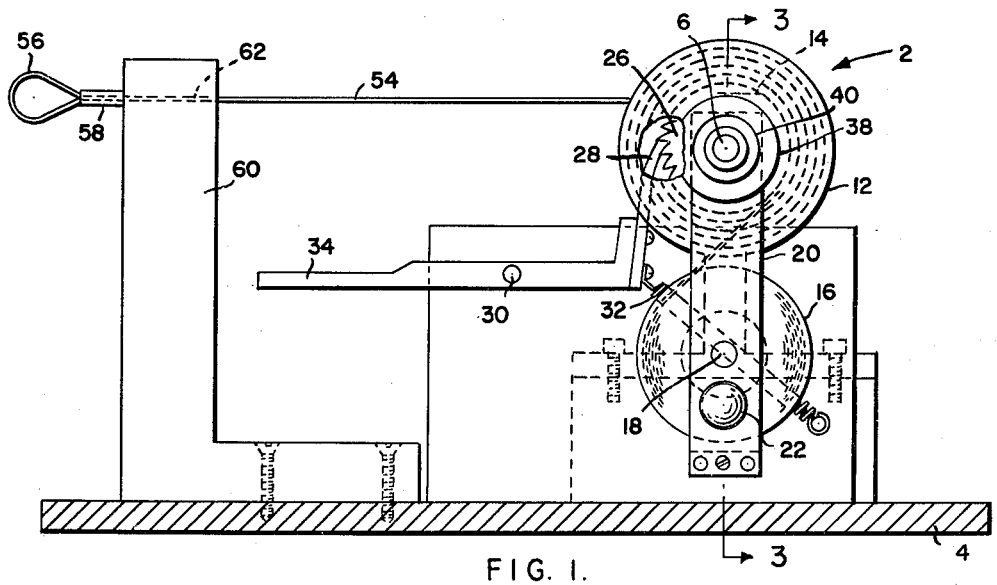
FIGURE 1 is a side elevation of a spring motor embodying the invention.
Figure 2:
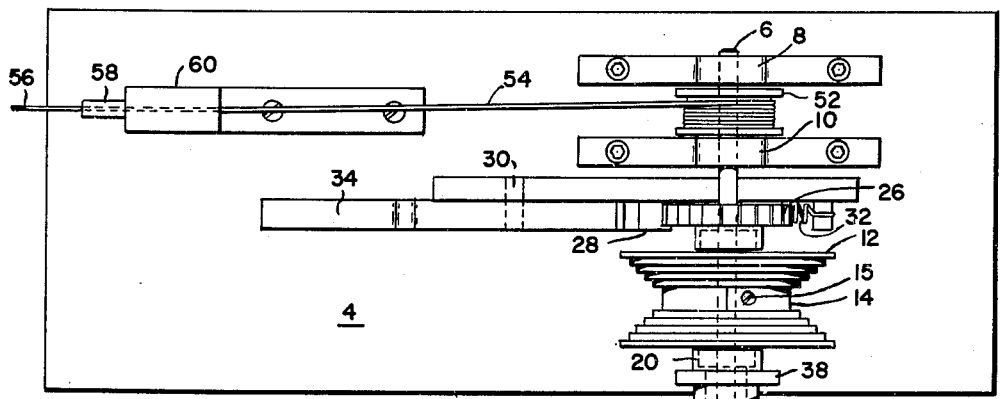
FIGURE 2 is a plan view of the spring motor of FIGURE 1.
Figure 3:
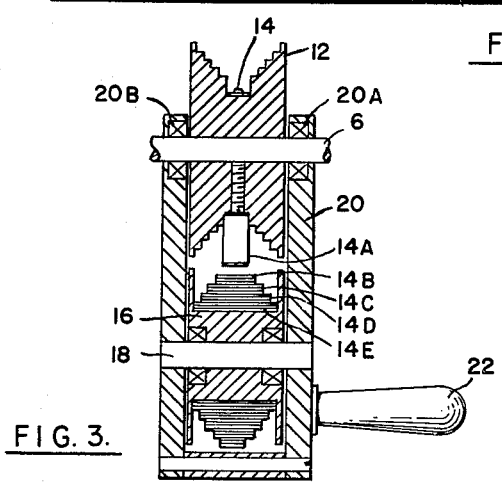
FIGURE 3 is a vertical section partially broken away taken on the plane indicated by the line 3—3 in FIGURE 1.

Referring to FIGURES 1 and 2, a spring motor 2 in accordance with the invention has a base 4. A shaft 6 is rotatably mounted in support members 8 and 10 which are fixedly secured to base 4. A stepped drum 12 is fixedly secured to shaft 6.

The outer end of a tightly coiled non-cumulative ribbon spring 14 is reversely wound onto output drum 12 and secured to drum 12 at 15. As in the case of an ordinary B motor, spring 14 tends to coil tightly onto a storage drum 16 which is mounted for free rotation about a shaft 18 which is secured to U frame 20. Frame 20 is rotatably mounted on shaft 6 by bearings indicated at 20A and 20B and is provided with a handle 22.

Spring 14 differs from the conventional tightly coiled non-cumulative force ribbon spring employed with a B motor in that it has a plurality of portions having substantially different widths indicated at 14a, 14b, 14c, 14d and 14e with relatively short transition portions therebetween as illustrated at 14a′ in FIGURE 4. By way of specific illustration, each of the portions having a different width may be of a length to place approximately three turns on storage drum 16 with the transition portions each being of a length equal to about ¼ of a turn. These figures are given merely by way of illustration and obviously may be widely varied. The force exerted by the spring 14 will vary directly with changes of width.

The torque exerted on shaft 6 for a typical motor is illustrated in FIGURE 5 with the torque in pound inches being plotted against the number of turns drum 12 has made in winding spring 14 onto drum 12. In FIGURE 5 the portions of the plotted line corresponding to the portions of spring 14 producing the line have been labeled with the number applied to that portion of the spring. For purposes of illustration, it will be assumed that portion 14a of spring 14 is ½ of an inch wide and will exert a torque of 2 pound inches; and that each succeeding portion is increased in width by $\frac{2}{16}$ of an inch. As practically shown in FIGURE 5, this will result in a series of force variations ranging from a force of two pound inches when portion 14a is in play and a force of four pound inches when portion 14e is in play. As is well known, the torque is developed by virtue of two concurrently working factors, mainly the straightening of spring 14 as it is unwound from storage drum 16 and the reverse bending of spring 14 as it is wound onto drum 12. Thus when a transition portion such as 14A′ commences to unwind from storage drum 16, i.e. is being straightened adjacent storage drum 16, an increase in torque results. This is illustrated by the portion L1 of the plotted line. As the transition portion 14A′ moves between drums 12 and 16 in a straightened condition, the torque exerted will remain substantially constant as indicated by the portion L2 of the plotted line. Then as the portion 14A′ is being reversely bent to be coiled onto drum 12, the torque will rapidly increase as indicated by the portion L3 of the plotted line until it has all been wound onto drum 12 and the only acting portion of spring 14 is portion 14b. At this stage, a higher constant torque will have been reached as indicated at 14B. This action is repeated as the transition is made from each portion of the spring 14 to the next wider portion. It will be apparent that the reverse effect is achieved when going from each portion of spring 14 to the next narrower portion.

Referring now to FIGURES 1 and 2, a ratchet wheel 26 fixedly secured to U frame 20 is engaged by a pawl 28 pivotally secured as indicated at 30 and biased against ratchet wheel 28 by an extension coil spring 32. Pawl 28 has a handle portion indicated at 34.

Flange 38 of tube 40 is fixedly secured to frame 20 and carries a set screw 42 which engages a slot 44 in a calibrated tube 46. Tube 46 threadably engages shaft 6 as indicated at 48.

As seen in FIGURE 2, a drum 52 has a cable 54 coiled thereon and is fixedly secured to shaft 6. Cable 54 has a looped end 56 secured by a clamp 58 which engages bracket 60 secured to base 4. Bracket 60 has an opening 62 to accommodate cable 54, but too small to accept clamp 58.

Operation

With the parts in the positions shown in FIGURES 1 and 2 the extension of cable 54 will result in a torque of 2 pound inches during the rotation of drum 12 for approximately 2½ turns assuming the torque characteristics to be as shown in FIGURE 5. Thus for a short stroke of cable 54 a substantially uniform tensioning force is achieved. Assuming that cable 54 is extended a very short distance to just clear clamp 58 from bracket 60, the tensioning force exerted by the motor can be changed without movement of cable 54 by moving the handle portion 34 of pawl 28 downwardly to release the pawl from ratchet wheel 26 and simultaneously rotating the frame 20 by handle 22 clockwise as viewed in FIGURE 1 to wind spring 14 onto drum 12 until, for example, the leading part of portion 14b commences to wind onto drum 12. This will result in increasing the tensioning force to the next higher force level at which point again a substantially constant force will be exerted for a short stroke of cable 54.

The force being exerted will be indicated by the calibrated tube 46. Irrespective of whether the spring is wound or unwound with respect to drum 12 there will be relative axial movement of tube 46 with respect to tube 40 since in either case there will be relative rotation between tube 46 and shaft 6. Thus tube 46 being calibrated to the spring employed will show the force being exerted.

Alternative embodiment

The winding and unwinding of the tightly coiled non-cumulative force ribbon spring with respect to the output drum without rotating of the output shaft can be accomplished in a number of different ways. An alternative embodiment is shown in FIGURE 6. Here a spring motor 70 has an output shaft 71 mounted for rotation in support members 72 and 74, a drum 76 is fixedly secured to shaft 71 and carries a cable 78 which has a looped end 80 secured by a clamp 82 which is adapted to engage a bracket 84 having an opening 86 through which cable 78 passes.

A gear 90 fixedly secured to shaft 71 engages a gear 92 fixedly secured to a shaft 94 which in turn is rotatably mounted in lever 96. Lever 96 is fixedly secured to a shaft 98 mounted for rotation in support members 100 and 102. A crank 104 is fixedly secured to shaft 98 which is coaxial with shaft 71. A stop pin 106 is adapted to pass through an opening in crank 104 and an opening 110 in bracket 112 to lock crank 104 in a predetermined position. For finer adjustment, a ratchet may be employed. An output drum 12, a tightly coiled non-cumulative force ribbon spring 14 and a storage drum 16 are all identical with the similarly numbered elements of the embodiment of FIGURE 1. Drum 12 is fixedly secured to shaft 94 and drum 16 is mounted for rotation on a shaft 114 which is secured to support members 116 and 118.

Operation

In this embodiment, when crank 104 is released for movement by withdrawal of pin 106 from bracket 112, crank 104 can be employed to rotate shaft 98 and lever 96 to cause the rotation of shaft 94 bodily about the axis of shaft 71 which causes the rotation of shaft 94 about its axis incident to the interaction of gear 92 with stationary gear 90. In this manner spring 14 can be wound up onto or unwound from drum 12 to vary the output force without any movement of output shaft 71 or cable 78 when cable 78 is under load. When crank 104 is held stationary by pin 106 being engaged with bracket 112, the extension of cable 78 will cause the winding up of spring 14 onto drum 12 by virtue of the rotation of shaft 71, gear 90, gear 92 and shaft 94. Within a limited range the tension force exerted will be constant as was thoroughly discussed with respect to the embodiment of FIGURE 1. Similarly when cable 78 is being wound onto drum 76, spring 14 will be unwound from drum 12 onto storage drum 16.

An alternative embodiment is shown in FIGURE 7 in which the output shaft 71 and associated drum and cable elements of FIGURE 6 are employed and given identical numbers. In this embodiment, shaft 71 is fixedly secured to a lever 130 on which is rotatably mounted a gear 132 which engages a ring gear 134 mounted for rotation about a shaft 136. A gear 138 fixedly secured to shaft 136 also engages gear 132. Integral with ring gear 134 is a gear 140 which engages gear 142 fixedly secured to a shaft 144 rotatably mounted in support members 146 and 148. Shaft 144 is fixedly secured to a crank 150. A pin 152 which is adapted to enter an opening 154 in crank 150 and an opening 156 in bracket 158 is employed to secure crank 150 in a fixed position. For finer adjustment a ratchet may be employed. An output drum 12, a tightly coiled non-cumulative force ribbon spring 14 and a storage drum 16 identical with those employed in the embodiment of FIGURE 1 are used. Output drum 12 is fixedly secured to shaft 136 which is mounted for rotation in support members 162 and 164. Storage drum 16 is mounted for rotation on a shaft 166 which in turn is secured to support members 168 and 170.

Operation

In operation of this embodiment, the removal of pin 152 permits the rotation of crank 150 to rotate shaft 144 and gears 142 and 140 to thereby rotate ring gear 134. Output shaft 71 and arm 130 remain stationary, the rotation of ring gear 134 causes the rotation of gear 132 about its axis and the consequent rotation of gear 138 and shaft 136 to cause the rotation of drum 12 to wind or unwind spring 14 on drum 12 to change the output force to the desired force. When lever 150 is held from movement by pin 152 in engagement with bracket 158, the extension of cable 78 and the consequent rotation of shaft 71 and arm 130 causes gear 132 to be carried about bodily within the stationary ring gear 134 which in turn causes gear 132 to rotate about its axis and rotate gear 138 and shaft 136 to unwind ribbon 42 from storage drum 16 onto output drum 12. The reverse occurs in the winding up of cable 78 on drum 76.

Where a substantial variation in forces is desired and yet a gradient can be tolerated, a constant variation in the width of the spring can be employed as illustrated in the spring shown totally extended in FIGURE 8. Springs of this type are known to the art, being disclosed in Patent No. 2,609,193, issued September 2, 1952. Similarly other motor forms employing tightly coiled non-cumulative force ribbon springs can be employed. An obvious variation is to employ an A motor form such as disclosed in Patent No. 2,647,743, issued August 4, 1953 (FIGURE 11) which in the above embodiments simply involves the direct winding of spring 14 onto drum 12 in lieu of the reverse winding employed in these embodiments.

Further, the intermediate stage torque L2 of FIGURE 5 can be increased if desired to have intermediate force steps of greater extent by decreasing the length of the transition portions of the spring or increasing the distance between the output and storage drums.

It will be understood that the above described embodiments are by way of illustration only and are not intended to be limiting.

What is claimed is:

1. In combination a spring motor comprising an output drum, a storage drum, said drums having spaced substantially parallel axes, and a tightly coiled non-cumulative force ribbon spring connecting said drums and tending to uncoil from the output drum and to coil onto the storage drum, said spring having a plurality of portions of different widths, output means connected to the output drum and means to transfer portions of the spring from one of said drums to the other of said drums without movement of the output means.

2. The combination of claim 1 in which said spring has a plurality of portions of substantial length each having a substantially uniform width and with adjacent such portions having substantially different widths.

3. The combination of claim 1 in which the spring for a substantial portion of its length is tapered from one width to a substantially greater width.

4. The combination of claim 1 in which the transfer means comprises means to rotate one of said drums about the axis of the other drum.

5. The combination of claim 1 in which the transfer means comprises means to rotate the output drum independently of the output means.

6. The combination of claim 1 in which the output means includes a shaft and a gear secured to the shaft and is connected to the output drum through a gear connected to the drum and the transfer means comprises means to rotate the output drum about the axis of the output shaft.

7. The combination of claim 1 in which the output means and the transfer means include differential gear means to provide for the rotation of the output drum independent of movement of the output means.

8. The combination of claim 1 in which the output means includes a shaft and is connected to the output drum through an arm secured to the output shaft, a planet gear secured to the arm, a ring gear engaging the planet gear and a gear engaging the planet gear and connected to the output drum and the transfer means comprises a gear integral and coaxial with the ring gear and a driving gear engaging the gear integral with the ring gear and means to control the positions of said driving gear.

9. The combination of claim 4 in which said spring has a plurality of portions of substantial length each having a substantially uniform width and with adjacent such portions having substantially different widths.

10. The combination of claim 4 in which the spring for a substantial portion of its length is tapered from one width to a substantially greater width.

11. The combination of claim 5 in which said spring has a plurality of portions of substantial length each having a substantially uniform width and with adjacent such portions having substantially different widths.

12. The combination of claim 5 in which the spring for a substantial portion of its length is tapered from one width to a substantially greater width.

13. The combination of claim 6 in which said spring has a plurality of portions of substantial length each having a substantially uniform width and with adjacent such portions having substantially different widths.

14. The combination of claim 6 in which the spring for a substantial portion of its length is tapered from one width to a substantially greater width.

15. The combination of claim 8 in which said spring has a plurality of portions of substantial length each having a substantially uniform width and with adjacent such portions having substantially different widths.

16. The combination of claim 8 in which the spring for a substantial portion of its length is tapered from one width to a substantially greater width.

No references cited.

JULIUS E. WEST, *Primary Examiner*.